3,272,697
PACTAMYCIN INSECTICIDE
Alan J. Lemin, Richland Township, Kalamazoo County, and Paul W. O'Connell, Kalamazoo, Mich., assignors to The Upjohn Company, Kalamazoo, Mich., a corporation of Delaware
No Drawing. Filed Apr. 30, 1964, Ser. No. 363,978
12 Claims. (Cl. 167—30)

This invention pertains to a novel biological process and novel compositions. The invention is more particularly directed to the novel process for controlling insect pests with pactamycin, and novel compositions comprising an insect nutriment or food with pactamycin.

Pactamycin is a biosynthetic compound produced by a species of actinomycete, *Streptomyces pactum* var. *pactum*, NRRL 2939, under controlled culture conditions in a nutrient medium. Various methods for the production, recovery, and purification of pactamycin are described in the published literature, e.g., B. K. Bhuyan et al., Antimicrobial Agents and Chemotherapy, 1961, p. 17; A. D. Argoudelis et al., ibid, p. 191; and T. F. Brodasky and W. L. Lummis, ibid, p. 198. Pactamycin is an amphoteric substance with a basic function of $pKa'$ 6.25–7.25 and an acidic function of $pKa'$ 9.00–9.60; a molecular weight of about 558; and characteristic ultra-violet absorption maxima as follows.

EtOH:
    239.5 m$\mu$, $a=51.22$
    264 (sh.) m$\mu$, $a=14.81$
    313 m$\mu$, $a=4.88$
    356 m$\mu$, $a=3.25$
0.01 ethanolic $H_2SO_4$:
    238 m$\mu$, $a=50.45$
    262 (sh.) m$\mu$, $a=14.65$
    314 m$\mu$, $a=4.75$
    352 m$\mu$, $a=3.51$
0.01 ethanolic KOH:
    238.5 m$\mu$, $a=56.38$
    264 m$\mu$, $a=16.01$
    322 m$\mu$, $a=6.05$ Pactamycin is highly soluble in lower-alkanols, lower-alkyl esters of lower-alkanoic acids, and chlorinated lower-alkanes. It is known to be useful as an antibiotic.

It has now been found, in accordance with the invention, that pactamycin is an insect poison. It has been found that pactamycin is a lethal poison for insects, but in less than lethal amounts causes reproductive sterility!

This newly discovered activity of pactamycin provides a novel means for controlling insect pests by killing them and by preventing reproduction. When insects are rendered reproductively sterile with pactamycin the females either fail to lay eggs or the eggs that are laid do not hatch. In the course of time, the adult insects age and die, the number of reproducing individuals becomes too small to maintain pestiferous populations, and control is thus achieved.

The insecticidal and insect sterilant properties of pactamycin depend upon the susceptibility of the various insects as well as the amount of pactamycin used. In general, larger amounts of pactamycin primarily effect mortality; whereas smaller amounts primarily effect sterilization. Hence, in accordance with practical economic considerations, pactamycin is preferably used in the smaller amounts sufficient for sterilization. Used in the smaller amounts, a pestiferous population of insects is not wiped out immediately as when insecticidal amounts are used; but succeeding generations are significantly reduced in numbers and reproductive potential, and undesirable pests can even be completely eradicated.

Pactamycin is active in low concentrations against flies, mosquitoes, thrips, bean beetles, mites, aphids, army worms, salt marsh caterpillars and other lepidopterous larvae. As used herein, the term "insect" is used in the same sense as in the Federal Insecticide, Fungicide, and Rodenticide Act of 1947 and refers generally to animals comprising the Phylum Arthropoda, illustratively, class Insecta, for example, orders Isoptera, Thysanoptera, Mallophaga, Hemiptera, Anoplura, Homoptera, Coleoptera, Lepidoptera, Orthoptera, Diptera, and Hymenoptera; and class Arachnida, for example, orders Araneae and Acarina.

In accordance with the process of the invention, insects are poisoned with pactamycin by means of direct topical applications, ingestion, or residual contact. The compound can be used insecticidally and as a sterilant in its pure form, but for practical purposes it is preferred that the process be effected with dilute formulations of pactamycin according to the invention, some of which are novel.

Insects susceptible to poisoning with pactamycin are readily controlled by spraying or dusting them directly or by spraying or dusting plants, objects, or other environs where they feed, hide, congregate, or mate. For this purpose aqueous and organic solutions, dusts, wettable powders, emulsifiable concentrates, and other readily dispersible formulations are contemplated as useful embodiments for effecting the process of the invention. Aqueous and organic solutions of pactamycin can be readily prepared by dissolving the compound in water or in a polar organic solvent such as methanol, ethanol, acetone, ethylene dichloride, and the like.

It is usually desirable, particularly in the case of aqueous spray formulations, to include adjuvants such as wetting agents, spreading agents, dispersing agents, stickers or adhesives, and the like, in accordance with usual agricultural practices. Any of the conventional wetting and dispersing agents of the anionic, cationic, and nonionic types that are commonly employed in compositions for application to plants can be used. Surfactants having sufficient wetting activity and therefore being suitable for the compositions of this invention include alkyl sulfates and sulfonates, alkyl aryl sulfonates, sulfosuccinate esters, polyoxyethylene sulfates, polyoxyethylene sorbitan monolaurate, alkyl aryl polyether sulfates, alkyl aryl polyether alcohols, alkyl quaternary ammonium salts, sulfated fatty acid esters, sulfated fatty acid amides, glycerol mannitan laurate, polyalkylether condensates of fatty acids, lignin sulfonates, and the like. It will be understood, of course, that the sulfate and sulfonate compounds suggested above will preferably be used in the form of their soluble salts, e.g., sodium salts. All of these surfactants are capable of reducing the surface tension of water to less than about 40 dynes per centimeter in concentrations of about 1% or less.

Suitable stickers or adhesives include albumin, calcium caseinate, alkylphenoxy polyoxyethylene ethanol (Hyonic PE–50), coconut oil fatty acid modified phthalic polyglycerol copolymer (Triton B–1956), and the like.

Dusts are prepared by dispersing pactamycin in an inert dusting powder such as pyrophyllite, diatomite, clays such as bentonite, Georgia clay, Attapulgus clay, Barden clay, wood or walnut shell flour, and the like. Dusting powder is understood to be a solid material comminuted so that it has an average particle size of less than 50 microns, advantageously, less than 15 microns. The amount of pactamycin active ingredient suitably present in a dusting powder formulation can vary advantageously from about 1% to about 90%, by weight, preferably about 1% to 25%, by weight. Illustratively, a dusting powder is obtained by mixing approximately equal parts of the active ingredient and pyrophyllite, comminuting either before or after the admixture as desired.

A wettable powder suitable for dispersing in an aqueous vehicle is obtained by adding a surfactant to a dusting powder. Suitable surfactants include sodium lauryl sulfate, sodium and calcium lignosulfonates, 1-tetradecyl-4-methylpyridinium chloride, Triton X–100 (isooctylphenoxy polyethoxy ethanol), and Pluronic F–68 (ethylene oxide-propylene glycol condensate, nonionic surfactant). If desired, the surfactant can be incorporated in the dry mixture either by dry milling or by adding it in solution in a volatile solvent such as ethanol or acetone, mixing to form a paste, drying, and milling.

For convenience in handling, pactamycin can be prepared with or without adjuvants in the form of concentrated solutions in a solvent, for example, acetone, ethyl acetate, dimethylformamide, dimethylacetamide, dimethyl sulfoxide, acetonitrile, cyclohexanone, and similar polar solvents. Such concentrates can be dispersed in a suitable volume of an aqueous medium in the presence of a surfactant such as those disclosed above to give a mixture of any desired concentration. The surfactant can be included in a concentrated solution of the active ingredient in a solvent to give an emulsifiable concentrate, or it can be added separately when the aqueous dispersion is being prepared.

For the most part, low concentrations of pactamycin are effective, and the concentration in formulations for direct application can range from about 50 to about 10,000 p.p.m. For example, excellent sterilizing action on Colorado potato beetle, *Leptinotarsa decemlineata* Say, has been obtained using concentrations of active ingredient ranging from about 100 to 500 p.p.m. For example, an emulsifiable concentrate comprising 5% (by weight) of the compound can be admixed with an aqueous medium in the proportions of two teaspoonfuls (about 10 cc.) of concentrate with one gallon of medium to give a mixture containing 120 to 150 parts of active ingredient per million parts of water. Similarly, three pints of a 5% concentrate mixed with 100 gals. of water provides about 180 p.p.m. of active ingredient. In the same manner, more concentrated solutions of active ingredient in a solvent can be incorporated with an appropriate quantity of an aqueous medium or petroleum base carrier, e.g., summer oil, kerosene, and like vehicles, to give a dispersible mixture of desired concentration.

A suitable wettable powder formulation is obtained by blending and milling 327 lbs. of Georgia clay, 4.5 lbs. of Triton X–100 as a wetting agent, 9 lbs. of a polymerized sodium salt of a substituted benzoid long-chain sulfonic acid (Daxad 27) as a dispersing agent, and 113 lbs. of pactamycin. The resulting formulation has the following percentage composition (parts herein are by weight unless otherwise specified):

| | Percent |
|---|---|
| Pactamycin | 25 |
| Triton X–100 | 1 |
| Daxad 27 | 2 |
| Georgia clay | 72 |

This formulation, when dispersed in water at one pound per 100 gals., gives a spray formulation containing about 0.03% (300 p.p.m.) active ingredient.

A suitable emulsifiable concentrate is obtained by admixing the following materials:

| | Parts |
|---|---|
| Pactamycin | 15 |
| Xylene | 81.5 |
| Dodecylbenzene sodium monosulfonate | 1.75 |
| Condensation product of one mole of octylphenol and about 12 moles of ethylene oxide | 1.75 |

The mixture of dodecylbenzene sodium monosulfonate and condensation product is added to the xylene, and the pactamycin is then added. This formulation, when dispersed in water at the rate of one pint per 100 gals., gives a spray formulation containing about 0.02% (200 p.p.m.) active ingredient.

Pactamycin can also be formulated in relatively dilute proportions in a dispersible insecticide carrier for household applications. Thus, the compound can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and compositions of this invention to actual practice can vary widely. Included among the variables that may be encountered are the degree of infestation by insects, the particular insect to be controlled, the particular plant being treated, the degree of development of the plant, the prevailing weather conditions, such as temperature, relative humidity, rainfall, dews, and so forth.

A preferred method for effecting the reproductive sterility in accordance with the invention employs a novel formulation comprising a solid or liquid carrier diluent for the pactamycin comprising an insect nutriment or food which stimulates insects to ingest the formulation and coincidently the active ingredient. If desired, the insect nutriment or food may suitably constitute the whole or substantial part of the carrier diluent. Granulated corn meal, bran, pomace, granulated sugar, and the like are suitable solid carrier diluents. Corn syrup, honey, molasses, and the like are suitable liquid carriers. Illustrative carrier diluents include one prepared by mixing 4 parts granulated sugar and 1 part orange juice crystals, and another prepared by mixing 6 parts powdered milk, 6 parts sugar, and 1 part powdered egg.

In general, suitable insect nutriments or foods for carrier diluents include carbohydrates, for example, sugars such as lactose, sucrose, fructose, glucose, and the like, and polymerized sugars such as starches, dextrins, pectins, and the like, and plant and animal proteins or protein degradation products such as egg albumen, meats, soybean oil meal, cottage cheese, proteoses, peptones, peptides, and the like.

The formulations of this invention containing insect nutriments or food for ingestion by insects may also be or contain an insect attractant for luring insects to the formulation containing the active ingredient. Suitable attractants include sec-butyl 6-methyl-3-cyclohexene-1-carboxylate (for Mediterranean fruit fly), sec-butyl 4 (or 5)-chloro-6 - methyl-cyclohexanecarboxylate, methyleugenol, 4-(p-acetoxyphenyl)-2-butanone, anisylacetone, and the like.

The following examples are illustrative of the process and compositions of the present invention, but they are not to be construed as limiting.

*Example 1*

Three populations of about 300 to 500 house flies, *Musca domestica* Linnaeus, were treated and observed as follows: One population was fed a dry diet consisting of 6 parts powdered milk, 6 parts sugar, and 1 part powdered egg. Water was also provided in a separate dish ad libitum. The second population was fed 0.1 percent pactamycin in the same basic diet with water ad libitum. The third population was fed 0.01 percent pactamycin in their diet. The eggs from the normal untreated population hatched substantially 100 percent, whereas the 0.1 percent level population laid no eggs, and the 0.01 percent level pactamycin treated population hatched only about 2 percent.

*Example 2*

In a field test, 10 kg. of a diluent carrier consisting of 6 parts powdered milk, 6 parts corn syrup, and 1 part powdered egg and water was thoroughly mixed with 10 g. of pactamycin and portions were spread out in shallow pans placed at various sites in a large, relatively isolated dairy feed lot and barn. Within 3 months, the population of house flies and faceflies had declined to the point that very few were seen on the premises.

Example 3

Efficacy of pactamycin as a sterilant for *Tetranychus cinnabarinus* is established by the following experiment and results. The experimental procedure involved applying pactamycin in acetone solutions to the upper surfaces of cotton plant leaves. Four concentrations of pactamycin were applied. The concentrations applied to different leaves contained 0.1%, 0.04%, 0.02%, and 0.01% pactamycin. One-half ml. of a solution was applied per leaf. After drying, three cages containing 10 adult female mites per cage were attached to the upper surface of each treated leaf. For each concentration and treated leaf an untreated leaf was similarly populated with caged adult female mites as control. Every two days thereafter, until the experiment was terminated, the adult female mites were removed from their cages and recaged on a fresh area of the leaf surface. The eggs laid by the female mites subjected to the various conditions were counted, they were separately transferred to the surface of an untreated leaf, and 4 days later the percentage hatchability was determined by counting the unhatched eggs and the immature mites. The results were as follows:

| Concentration of Pactamycin | Total No. Eggs | Percentage Hatchability |
|---|---|---|
| 0.1% | 192 | 1.1 |
| None (Control) | 101 | 98.5 |
| 0.04% | 444 | 6.7 |
| None (Control) | 364 | 99.0 |
| 0.02% | 359 | 13.0 |
| None (Control) | 374 | 100. |
| 0.01% | 1046 | 76.0 |
| None (Control) | 294 | 100. |

The results establish efficacy of pactamycin as a sterilant when ingested by adult female *Tetranychus cinnabarinus*. They show that 0.1%, 0.04%, and 0.02% concentrations of pactamycin applied to forage vegetation reduced hatchability of the mite eggs from 100% down to 1.1%, 6.7%, and 13.0%, respectively. The treatment thus prevented normal reproduction of the species.

We claim:
1. The process of controlling insects which comprises applying to said insects an effective amount of pactamycin.
2. The process of rendering insects reproductively sterile which comprises inducing insects to ingest an effective amount of pactamycin.
3. The process of claim 1 wherein dipterous insects are controlled.
4. The process of claim 2 wherein dipterous insects are made reproductively sterile.
5. The process of rendering insects reproductively sterile which comprises inducing the insects to ingest an effective amount of a composition comprising 0.005 percent to 1.0 percent pactamycin, a nutriment and a carrier diluent.
6. The process of claim 5 wherein the nutriment is a carbohydrate.
7. The process of claim 2 wherein house flies, *Musca domestica* Linnaeus, are rendered reproductively sterile.
8. Composition for rendering insects reproductively sterile which comprises from about 0.01 to about 1.0 percent pactamycin, as the essential active ingredient, and a carrier diluent comprising an insect nutriment.
9. Composition according to claim 8 and an insect attractant.
10. Composition for rendering dipterous insects reproductively sterile which comprises from about 0.01 to about 1.0 percent pactamycin as the essential active ingredient, and a carrier diluent consisting of powdered milk, sugar, and powdered egg.
11. The process of claim 2 wherein mites are made reproductively sterile.
12. The process of claim 11 wherein female *Tetranychus cinnabarinus* mites are made reproductively sterile.

References Cited by the Examiner
UNITED STATES PATENTS
3,183,154  5/1965  Argoudelis et al. _____ 167—65

JULIAN S. LEVITT, *Primary Examiner.*

JEROME D. GOLDBERG, *Assistant Examiner.*